United States Patent
Aghassipour

(10) Patent No.: US 7,130,771 B2
(45) Date of Patent: Oct. 31, 2006

(54) SYSTEM AND METHOD FOR OPTIMIZATION OF AND ANALYSIS OF INSULATED SYSTEMS

(76) Inventor: Xerxes Aghassipour, 1085 Commonwealth Ave., #187, Boston, MA (US) 02215

(*) Notice: Subject to any disclaimer, the term of this patent is extended or adjusted under 35 U.S.C. 154(b) by 89 days.

(21) Appl. No.: 10/485,932

(22) PCT Filed: Aug. 5, 2002

(86) PCT No.: PCT/US02/24876

§ 371 (c)(1),
(2), (4) Date: Jul. 16, 2004

(87) PCT Pub. No.: WO03/012602

PCT Pub. Date: Feb. 13, 2003

(65) Prior Publication Data

US 2004/0243353 A1 Dec. 2, 2004

Related U.S. Application Data

(60) Provisional application No. 60/294,133, filed on Aug. 3, 2001.

(51) Int. Cl.
*G06F 15/00* (2006.01)
(52) U.S. Cl. .............. 702/187; 702/128; 702/179; 235/462.01; 235/472.01; 235/375; 206/301
(58) Field of Classification Search ............ 702/128, 702/130, 179, 187; 235/462.01, 472.01, 235/375; 206/301; 701/25
See application file for complete search history.

(56) References Cited

U.S. PATENT DOCUMENTS 5,787,233 A 7/1998 Akimoto .................. 395/10

(Continued)

FOREIGN PATENT DOCUMENTS

DE 1017882 5/1995

OTHER PUBLICATIONS

Takakuwa et al., 'A Practical Module-Based Simulation Model For Transshipment-Inventroy Systems', 1999, IEEE Publication, pp. 1324-1332.*

(Continued)

*Primary Examiner*—Marc S. Hoff
*Assistant Examiner*—Elias Desta
(74) *Attorney, Agent, or Firm*—Sofer & Haroun, LLP

(57) ABSTRACT

The present invention is directed to a method for generating a list of package shipment routes in a shipment solution system comprising the steps of entering product information, place of origin, destination and shipment temperature parameters for a package into the system. A list is generated containing a listing of all possible shipment routes available for the package between the place of origin and the destination. For each of the shipment routes, an ambient thermal temperature model is generated corresponding to the external temperatures the package is exposed to during each of the possible shipment routes. The thermal characteristics of the package are calculated along the available shipping routes, based on each of the ambient thermal temperature models, so as to determine feasible shipment routes and corresponding packaging information. For each of the feasible shipment routes, the cost for shipment along the feasible shipment routes is calculated based on packaging and delivery cost and a route is selected for delivery from among the feasible shipment routes.

10 Claims, 14 Drawing Sheets

U.S. PATENT DOCUMENTS

| | | | |
|---|---|---|---|
| 5,942,750 A * | 8/1999 | Sannerhaugen et al. | 250/227.14 |
| 5,983,198 A | 11/1999 | Mowery et al. | 705/22 |
| 6,321,992 B1 * | 11/2001 | Knowles et al. | 235/462.01 |
| 6,374,178 B1 | 4/2002 | Nakagawa et al. | 701/202 |
| 6,397,163 B1 | 5/2002 | Hoyt et al. | 702/136 |
| 2002/0004724 A1 | 1/2002 | Eastman | 705/1 |

OTHER PUBLICATIONS

Yin-Man Wong, 'Technology management in the air express industry, a case study', Oct. 1997, IEEE Publication, pp. 251-256.*

Hobeika, 'A Route Guidance System under Modified Network Conditions', 1989, IEEE Publication, pp. 170-175.*

International Search Report dated Feb. 20, 2003.

Fedex and Technology—Maintaining a Competitive Edge dated Dec. 9, 1996.

* cited by examiner

| | |
|---|---|
| 200¹ | User (Order-Entry) Supplies Customer Destination, Product, Quantity, and Delivery Constraints during Order-Entry |
| 202² | The Optimization Engine queries the Product Database to Determine the Products Origin (Distribution Center), Temperature Parameters (Maximum & Minimum), Mass, Staging Temperature, Thermal Properties, and Appropriate Packaging Types (Containers & Refrigerant/Warm Packs) available in Packaging Database |
| 204³ | Based on Destination, Origin, and Delivery Constraints obtained in 1 the Optimization Engine will determine all possible ways to ship the package by querying the Carrier/Mode Database |
| 206⁴ | The Optimization Engine queries the Product Database to determine the Safety Buffer Required for each delivery option |
| 208⁵ | Using the Carrier/Mode Database the Carrier/Mode Routing Engine determines the Total Time, including safety buffer 4, that each delivery option will require. |
| 210⁶ | Querying the Product Database and Packaging Database the Optimization Engine determines all possible packaging container options for the Product. For each viable packaging container option the Outside Dimension, Inside Dimension, Weight, Cost, and Thermal Properties (R-value, Insulation Thickness) are obtained |
| 212⁷ | The Optimization Engine creates a "Packaging System" for each viable package option. Each "Packaging System" will include the container (fixed), the product shipped (fixed), and the Refrigerant/Warm Pack Quantity (variable) |
| 214⁸ | Querying the Product Database the Optimization Engine will determine the ambient temperature for each "Packaging System". |

The ambient temperature can be either predetermined (static), or based on historical temperatures by querying the Weather Database (Historical) and running the Ambient Thermal Temperature Modeling Engine, or based on actual real-time forecasted weather data by querying the Weather Database (Forecasted) and running the Ambient Thermal Temperature Modeling Engine

10 218

The Packaging Thermal Modeling Engine calculates the amount of Refrigerant/Warm Packs necessary for the "Packaging System" 7 to stay within the required temperature parameters as determined in the Product Database for the time period calculated in 5

11 220

Knowing the Refrigerant/Warm Pack quantity necessary to maintain the product within its temperature parameters for each "Packaging System" 10 the Optimization Engine stores each result in memory as a "Possible Shipping Solution"

12 222

By querying the Packaging Database the Optimization Engine eliminates all "Possible Shipping Solutions" that require more Refrigerant/Warm Packs than the Insulated Container can contain by volume.

13 224

The Carrier/Mode Costing Engine determines the shipping cost for each "Possible Shipping Solution" that has not been eliminated in 12

14 226

The Optimization Engine queries the Packaging Database and determines the total cost of each "Possible Shipping Solution" by adding the total packaging cost for each "Possible Shipping Solution" to the shipping cost determined in 13

15 228

The Optimization Engine presents the User (Order-Entry) with all the "Possible Shipping Solution" sorted by total cost, or total cost by specified delivery date.

Fig 2b

| | | |
|---|---|---|
| 23<br>244 | The Shipment Workstation prints the appropriate label from the Label Printer for the completed order and stores the orders tracking number in the Tracking and Tracing Database. | |
| 24<br>246 | The Radio Frequency Interrogator queries the Product Database to determine the products temperature parameters for that order. | |
| 25<br>248 | The Radio Frequency Interrogator sends a signal to the Radio Frequency Temperature Recorder to begin recording the temperature inside the container. Any temperatures that are recorded beyond the parameter determined in 24 will trigger an out of range alarm indicator | |
| 26<br>250 | The recipient of the package can determine if the product has traveled safely within its temperature parameters. A Radio Frequency Interrogator can download the internal temperature of the package in transit and save them in the Tracking and Tracing Database for validation and auditing purposes | |
| 27<br>252 | By Querying the numerous databases of the system the Reporting Engine can evaluate and audit the Optimization Engines performance and reliability and fine tune the system for maximum efficiency | |

Fig 2d

Fig. 4 insulatedsolutions

Shipping Steps: Recipient | Delivery Review | Delivery Options | Select

300

| | | |
|---|---|---|
| Carrier: | All Parcel & Postal ▼ | 402 |
| Ship Date: | Today - April 3 ▼ | 404 |
| Delivery Date: | Most Economical ▼ | 406 |
| Date Specified: | None ▼ | 408 |
| Time of Day: | Morning ▼ | 410 |
| Reverse Logistics: | ● Yes   ○ No | 412 |
| Advanced Delivery Notification: | ● Yes   ○ No | 414 |
| A.D.N. Via: | E-mail ▼ | 416 |

Fig. 6

Insulatedsolutions 500

| Setup Steps | Company | DC's | Packaging | Product | Carrier/Mode |

| Field | Value | Ref |
|---|---|---|
| Contact Name: | Jane Smith | 602 |
| Contact Title: | Shipping Manager | 604 |
| Company Name: | Rx-XYZ Inc. | 606 |
| Address 1: | #2 Fifth Street | 608 |
| Address 2: | | 610 |
| City: | Peabody | 612 |
| State: | MA | 614 |
| Postal Code: | 01960 | 618 |
| Country: | USA | 620 |
| Phone: | 781-397-6200 | 622 |
| Fax: | 781-397-6300 | 624 |
| Email: | jsmith@rx-xyz.com | 626 |
| View DC: | MA - Peabody ▼ | 628, 629 |

New DC — 630
Next Step — 632

Fig 7

Insulatedsolutions

Setup Steps: Company :: DC's :: Packaging :: Product :: Carrier/Mode — 500

| | | |
|---|---|---|
| Item Type: | Insulated Container ▼ | — 702, 704 |
| Item # : | 2334 | |
| Inside Dimension: | length [8] width [6] height [9] ● In ○ cm | — 706 |
| Outside Dimension: | length [11] width [9] height [12] ● In ○ cm | — 708 |
| Weight: | [2.125] ● lbs ○ kgs | — 710 |
| Manufactured By: | Tech Pak Solutions | — 712 |
| Manfacurer #: | TP6 | — 714 |
| Type: | Expanded Polystyrene Foam (EPS) / R-3.85 per Inch ▼ | — 716 |
| View Item: | 3475 ▼ | — 718 |

[New Item] — 720   [Next Step] — 722

Fig 8 insulatedsolutions

| Setup Steps: | Company | DC's | Packaging | Product | Carrier/Mode |

800

Item # : 2356789 — 802
Item Name : Humalin® — 804
Manfactured By: Eli Lilly — 806
Manfacurer # : 349864 — 808

Outside Dimension: length 1.25  width 1.25  height 3.00   ⦿ In  ○ cm — 810

Weight: .00200  ⦿ lbs  ○ kgs — 812

Staged Temp.: 4.00  ⦿ °C  ○ °F — 814

Temp Parameter: Between 0° C. - 18° C. ▸ — 816

View Item: 2354789 ▸ — 818

New Item  820
Next Step  822

FIG. 9

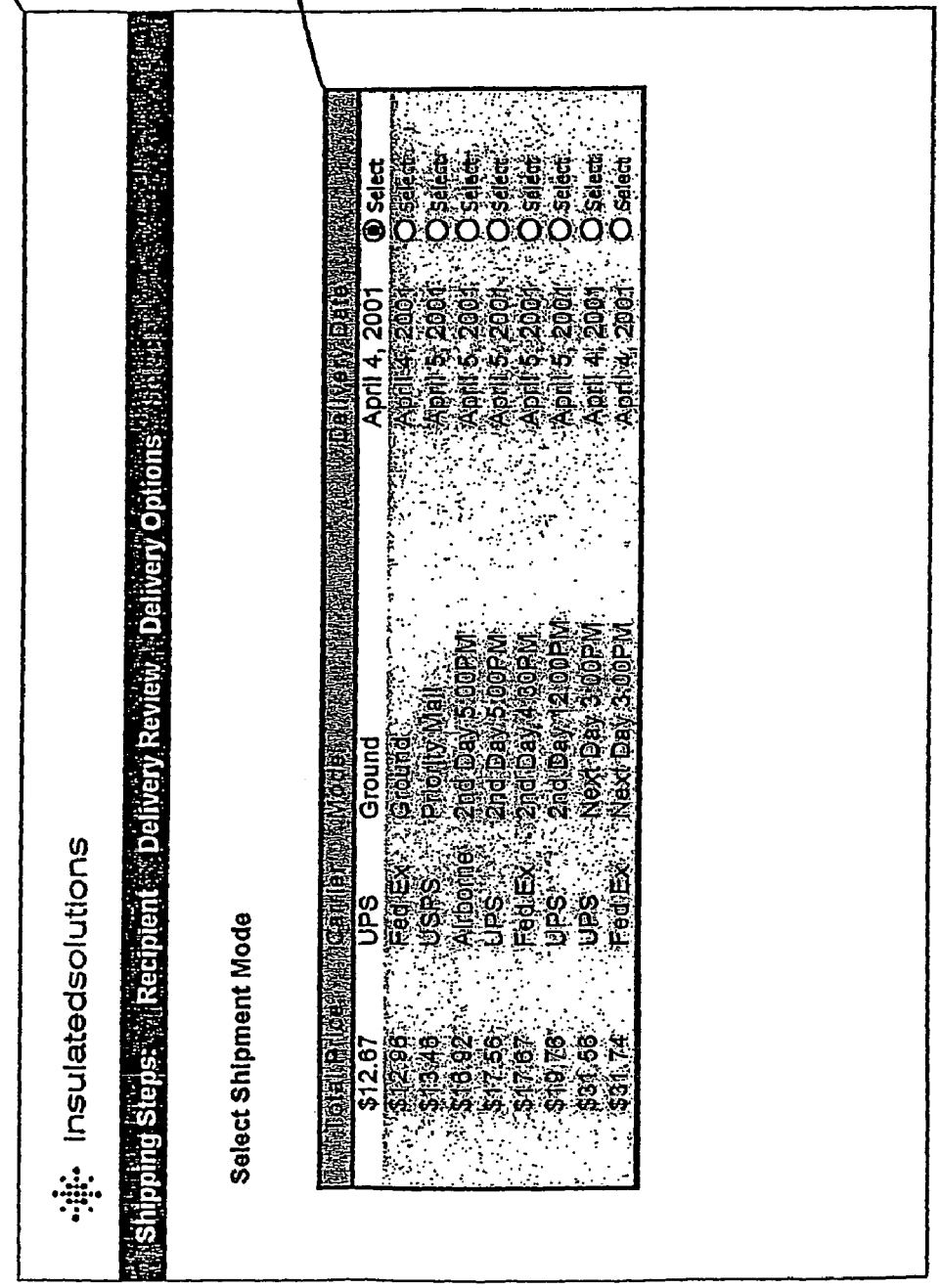

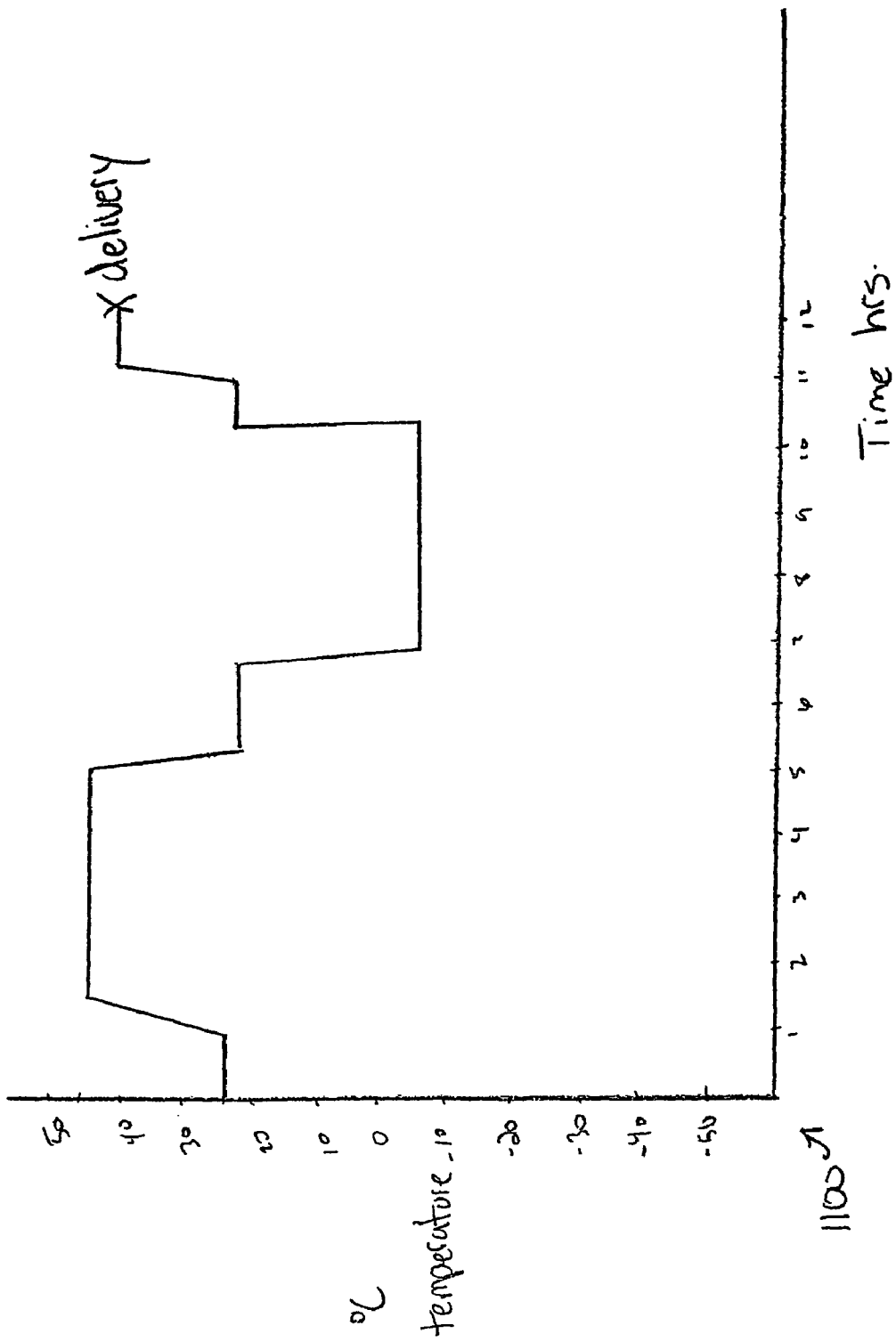

SYSTEM AND METHOD FOR OPTIMIZATION OF AND ANALYSIS OF INSULATED SYSTEMS

RELATED APPLICATIONS

This application is a National Phase Application of PCT/US02/24876, and claims priority to U.S. Provisional Application 60/294,133 entitled SYSTEM AND METHOD FOR OPTIMIZATION OF AND ANALYSIS OF INSULATED SYSTEMS filed on Aug. 3, 2001, entirety of which is incorporated herein by reference.

FIELD OF THE INVENTION

The present invention relates to a system and method for a logistics platform for use in optimizing the transport of goods. More specifically, the present invention relates to providing a logistics platform for use in optimizing the delivery of perishable goods.

BACKGROUND OF THE INVENTION

The shipment of perishable goods, particularly by air and sea, involves a complicated process of packaging and transportation. A balance must be struck between keeping costs manageable while at the same time maintaining the security and quality of the product being shipped. This process includes many difficult decisions such as determining the optimal amount of insulated packaging, refrigerant required and other perishable goods transportation requirements.

Common causes of loss of perishable goods during shipments include, but are not limited to, packing errors, mishandling, regulatory and customs holdups, unseasonably high and low temperatures, flight delays, recipients that are unable to receive delivery, and other unforeseeable difficulties. Services that provide near-perfect service in order to overcome these difficulties are often very expensive. This follows because such services handle their packaging needs based on a worst case scenario and employs containers insulation and refrigerants for the worst foreseeable delivery arrangements.

In response to the considerable demands placed on global companies to streamline their supply chains, many of the larger corporations have begun employing technology-based solutions, such as shipment tracking and tracing features and recipient e-mail notification. However, most of the platforms currently available are directed to the delivery of common goods and are not readily convertible for use with the transport of perishable goods. As such, a need exists in the field of delivery of perishable goods to provide a service that provides, a complete end to end logistics platform, which optimizes all of the various steps required in a shipment process.

SUMMARY OF THE INVENTION

As such, the present invention provides a complete logistics platform which combines optimization technology, packing technology, and group aggregation in order to extract the maximum value in a perishable goods supply chain. The optimization technology enables efficiency gains by employing algorithms, which simultaneously evaluate multiple variables. A shipper enters the temperature parameters within which a product temperature must remain during the shipment, origin and destination address of the shipment and the system analyzes all of the possible shipping carrier and shipment options and evaluates the refrigerant quantities needed to maintain the product at the specific temperature provided. The systems then gives the shipper the ability to rank and select the possible routes based on cost, delivery date or any other criterion that the shipper wishes to view.

The system also provides the shipper with a choice of feasible packaging arrangements for the desired delivery.

Furthermore, in accordance with another embodiment of the invention, the system is configured to monitor the temperature of the product being shipped so as to ensure that its temperature had substantially stayed within its specified range. And, if not, the system is configured to determine at which point during the shipment process the product temperature fell out of or exceeded the specified range. The temperature monitoring is provided by the use of radio frequency tags placed in the packaging.

The system is configured to interface with all of the various parties involved in the supply chain of the goods including but not limited to the shipper client and their customer service office, the goods receiver, the packaging service, the IT service providers, and other 3rd parties such as freight shippers, and the shipper's distribution centers. This cross party logistics platform greatly optimizes the supply chain for perishable goods not only by organizing the supply chain, but also by providing access to all parties involved in the supply chain so that valuable information can be easily shared with all of the necessary parties.

BRIEF DESCRIPTION OF THE DRAWINGS

FIG. 2a is a flow chart of the steps involved in operating the system in FIG. 1 in accordance with one embodiment of the present invention;

FIG. 2b is a flow chart of the steps involved in operating the system in FIG. 1 continued from FIG. 2a in accordance with one embodiment of the present invention;

FIG. 2d is a flow chart of the steps involved in operating the system in FIG. 1 continued from FIG. 2c in accordance with one embodiment of the present invention;

FIG. 3 is a screen shot of the order entry phase of the recipient's information, in accordance with one embodiment of the present invention;

FIG. 4 is a screen shot of the order entry phase of the delivery constraints, in accordance with one embodiment of the present invention;

FIG. 6 is a screen shot of the distribution center's information stored during the setup phase, in accordance with one embodiment of the present invention;

FIG. 7 is a screen shot of the packaging properties stored in the packaging database during the setup phase, in accordance with one embodiment of the present invention;

FIG. 8 is a screen shot of the product properties stored in the product database during the setup phase, in accordance with one embodiment of the present invention;

FIG. 9 is a screen shot of the carrier/mode properties stored in the carrier/mode database during the setup phase, in accordance with one embodiment of the present invention;

FIG. 10 is a screen shot of the shipping solutions, in accordance with one embodiment of the present invention; and FIG. 11 is an ambient thermal temperature profile, in accordance with one embodiment of the present invention.

DESCRIPTION OF THE INVENTION

Figure 1:
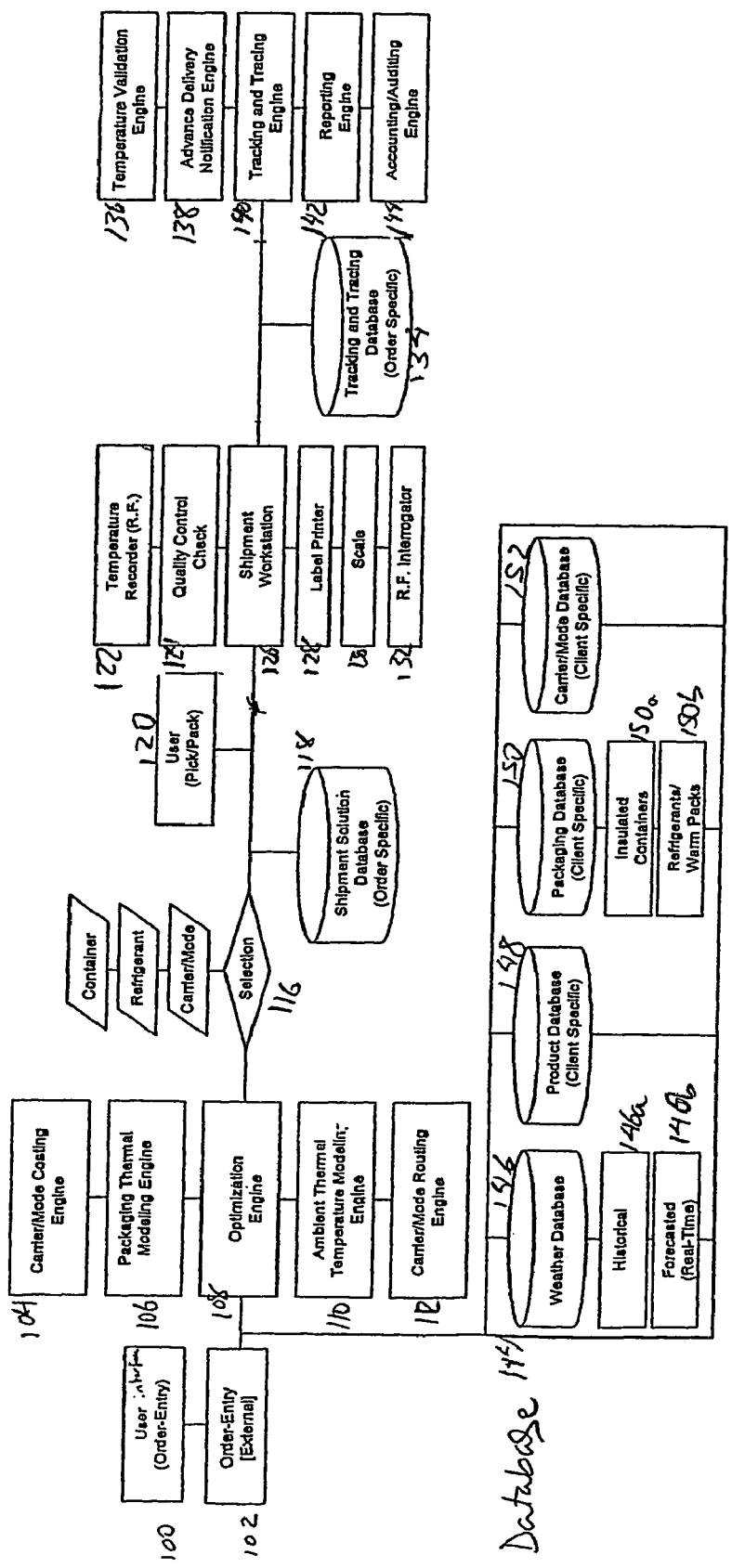
FIG. 1 is a block diagram of a logistics platform in accordance with one embodiment of the present invention.
Figure 2C:
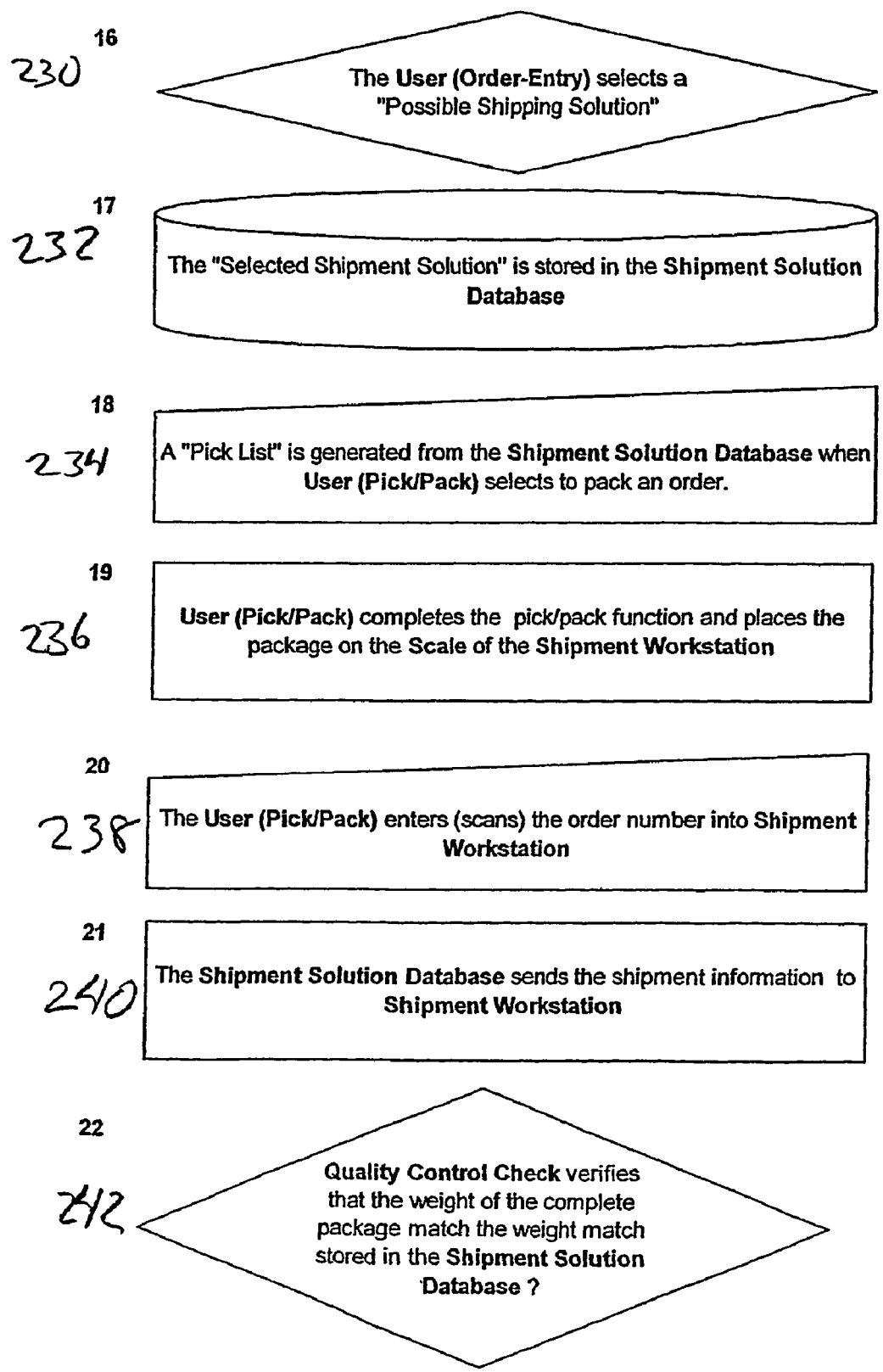
FIG. 2c is a flow chart of the steps involved in operating the system in FIG. 1 continued from FIG. 2b in accordance with one embodiment of the present invention.

The present invention provides for a logistics platform system 10 having the structure set forth in FIG. 1.

In one embodiment of the present invention, illustrated in FIG. 1, system 10 comprises a user interface module 100, that allows the user to input the order.

An external order entry module 102 is provided, configured to store a log of the day's orders and then the orders are combined and entered together into system 10. User interface 100 and external order-entry 102 are coupled to an optimization engine 108. Optimization engine 108 receives orders from user interface module 100 and external order entry module 102. Optimization engine 108, coupled to the database 114, retrieves information required for the order.

After retrieving the appropriate information, optimization engine 108 uses the order information to determine the product's origin (distribution center), temperature parameters (the maximum and minimum temperatures that define the temperature range that the product must be maintained within through out the entire shipment), mass (weight of the product), staging temperatures (starting temperature during the packaging process), thermal properties (rate at which the product itself retains or losses heat), and appropriate packaging types (packaging materials and their various heat transfer properties as well as refrigerant or warm packs and their associated ability to maintain constant product temperature within the package), and all possible ways to ship the package (including all of the available carriers, employed by a particular shipper, that deliver to the desired destination and the actual geographic route that the package will traverse using that particular carrier).

Database 114 is configured to store information, which can be accessed by system 10, and used to generate the shipping solutions. (The user specifies information that is stored in database 114.) A weather database 146 stores both historical 146a and forecasted (real-time) 146b weather information. Weather database 146 may receive information from system 10 based on prior shipping results discussed in more detail below. A product database 148 stores the properties of products, such as products origin (distribution center), mass, temperature parameters (maximum and minimum), staging temperature for the product, products tolerances, required safety buffer if required (additional thermal range required to ensure that a product does not spoil, particularly in the case of extremely temperature sensitive products), and product thermal properties.

A packaging database 150 stores different types of insulated packages information 150a that can be used, such as styrofoam or reusable containers information as well as the different types of refrigerants/warm pack information 150b that can be used. For each of the package information stored in packaging database 150 outside dimension, inside dimension, weight, cost, and thermal properties (Insulation or R-value inftz Fh/Btu, insulation, thickness) are included. Insulated package and refrigerant/warm pack information 150a and 150b are client specific, based on the various client uses. A carrier/mode database 152 stores information such as what carriers the client uses and the modes of shipment, such as overnight 2nd day or 3rd day ground, that those carriers offer, including the actual geographic routes which are traveled over in those modes.

Database 114 can be updated either through the user inputting data, shipping information provided over the internet, or data installation, such as CD ROM provided by the carriers at the location of the database. Updates can also be based on feed back information from the system itself, a process described in more detail below.

It should be noted that weather database 146, product database 148, package database 150, and carrier/mode database 152 are all in database 114 and can share information and are accessible to system 10. Database 114 and its component databases can exist as either a single database or as a conglomeration of several databases as illustrated. These examples of databases for storing information are intended only as examples of possible types of databases and information used and are in no way intended to limit the scope of the present invention. Any similar database used for operation within a similar system is within the contemplation of the present invention.

A carrier/mode routing engine 112 is coupled to optimization engine 108 and configured to determine all of the possible routes that the product might be shipped over. Depending on how the package will be shipped, carrier/mode routing engine 112 determines what states, city, or zip codes the package will be routed through so as to allow retrieval of the weather forecast for the intended route. The possible routes that can be used are provided by the carrier/mode routing engine 112 and delivered to an ambient thermal temperature modeling engine 110.

For example, in operation carrier/mode routing engine 112, using carrier/mode database 152, determines a route for each carrier such as USPS, UPS, FedEx, DHL and each of their modes of delivery such as 2nd day air, ground, next day am, and next day pm. This model information includes the specific cities traveled through and transportation mode used such as plane, train or motor vehicle.

Ambient thermal temperature modeling engine 110 is configured to receive the carrier route information from carrier/mode route engine 112 and generate a temperature profile 1100, as illustrated in FIG. 11, for each of the possible routes based on predetermined temperature metrics or historical temperature data stored in weather database 146. Temperature profile 1100 may correlate to a particular shipment's seasonal and geographical route or it may be based on actual real-time forecasted data in correlation to a particular shipment's geographic routing.

For example, profile 1100 may relate to a shipment originating in Binghamton, N.Y. to Miami. Profile 1100 first portion represents the situation where the package is placed in truck during summer season for a four hour drive from Binghamton to Queens. During this time the air temperature in the truck may spike +20 C. The package is then loaded on a plane and is flown for 3½ hours to Miami where, air temperature surrounding the package drops −30 C. while on plane. The package is then loaded on to a truck, and is driven 40 minutes to its destination, where the temperature again spikes +25 C. Profile 1100 created mimics the temperature conditions that the package will encounter in each of the possible carrier/model scenarios profiled. The profile contains temperatures and the duration that the package will endure during its trip. At first, profile 1100 may be defined based on the worst case scenario weather data.

However, through feedback, the system optimizes the weather profile to what is more closely experienced by the package as weather database 146 is populated by saved temperature information from recent past shipments.

A packaging thermal modeling engine 106, is coupled to optimization engine 108. Engine 106 uses profile 1100 from the possible routes generated by ambient thermal temperature modeling engine 1 10 and calculates the temperature inside the package during the entire route. Packaging thermal modeling engine 106 subsequently generates a thermal model so as to evaluate how much refrigerant/warm packs are necessary to maintain the package within the specified parameters. Packaging thermal modeling engine 106 calculates how long the desired temperature can be maintained inside the package, taking into account the mass of the product, the mass of the refrigerant/heat packs, the thermal properties of the product, packaging or refrigerant/warn packs, the product temperature parameters, and the carrier/mode profiles generated by carrier/mode routing engine 112.

Packaging thermal modeling engine 106 utilizes basic heat transfer principles such as those found in Fundamentals of Heat Transfer, by David P.

Dewitt and Frank P. Incropera, copyrighted 1981, the entirety of which is incorporated herein by reference. For example, using heat transfer principles, packaging thermal modeling engine 106 determines that for a particular profile 1 100 the product that is packaged in a Styrofoam package requires 4 pounds of dry ice, or, the same product is packaged in a plastic package requires 10 pounds of dry ice in order to maintain its specified temperature parameter. This process is repeated for each packaging alternatives based on its ambient thermal profile.

A carrier/mode costing engine 104 coupled to optimization engine, calculates the cost to ship each package according to all the feasible shipping options wherein the specified temperature parameters of the package can be maintained within its specified range. In determining the shipment cost, engine 104 takes several variables into account, such as, the weight and volume of the package, the carrier and the mode of shipment, the insurance amount for shipment, the value of the package, whether it is COD (cash on delivery), whether it is hazardous material, and whether a signature is required for receipt.

Carrier/mode costing engine 104 then outputs the shipping cost for all feasible carrier modes of delivery. For example, the weight of package plus additional weight of refrigerant/warm pack calculated by packaging thermal modeling engine 106 is used to calculate the cost to ship via each of the determined carrier/modes from carrier/mode routing engine such as next day air, or ground. Additionally, any extras such as COD or insurance are added into the cost.

Optimization engine 108 consolidates all the feasible results and forwards them to selection module 116. It is noted that either separate modules or a single optimization engine with all the components contained in it can perform functions as illustrated. The modules used by the optimization engine 108 are only an example of a type of optimization engine that can be used and are in no way intended to limit the scope of the present invention. Any similar optimization engine i8n software or hardware format used in a similar system is within the contemplation of the present invention.

In response to a user selecting a feasible shipping option, selection module 116 provides the relevant shipment details such as the container that is required for the selected shipment route and the amount and type of refrigerant or heat for the selected shipment route. An example of a display that allows shipment selection is illustrated in FIG. 10, wherein a shipment selection page 1000 with shipment selection box 1010 is shown.

In addition to storing selections made at selection module 116, shipment solution database 118 can store solutions that allow the system to automatically make the selection. Shipment solution database 118 can be set so that it automatically picks a shipping solution based on a desired criteria set by the user such as the cheapest solution, cost efficient, fastest solution, worst case scenario, or by deadline for shipment. After selection of a shipment solution, the user is prompted with packaging instructions at a user(pick/pack) module 120. During the packaging, a radio frequency temperature recorder 122 is inserted in the package. Recorder 122 periodically records the temperature inside the package at any given interval chosen by the user. Temperature recorder 122 is configured o receive and store the temperature parameters for the package that specifies the temperature range within which the product must remain. As such, radio frequency recorder 122 functions as an indicator should the package go outside the temperature parameters downloaded for the product contained in the package.

In one embodiment of the present invention a red light, located on temperature recorder 122 indicates that the temperature has gone outside the set parameter. For example, product has temperature parameter of 00 C. to 180 C. and during transit the temperature rises to 196 C., radio frequency temperature recorder 122 illuminates a red light indicator, such that upon delivery the recipient who opens the package will immediately know to of a possible problem.

Radio frequency recorder 122, after the shipment is received, is used to validate the temperature throughout the delivery, in process described below.

After the package is packed it is sent to a shipment workstation 126. Shipment workstation 126 is configured to receive the selected shipment solution and an order number is scanned into shipment workstation 126.

A radio frequency interrogator 132, is configured to receive the temperature parameters for radio frequency temperature recorder 122. Radio frequency interrogator 132 is also configured to receive the uploaded information from radio frequency temperature recorder 122, throughout the duration of the trip. Radio frequency interrogator 132 can be placed at various points along the shipping route or at the final destination or there can be a reusable container in which radio frequency temperature recorder 122 is returned to the sender where they can upload the information to radio frequency interrogator 132. Radio frequency interrogator 132 can also be coupled to the internet to upload the information received from radio frequency temperature recorder 122.

The package is placed on a scale 130. Scale 130 is coupled to shipment workstation 126 and quality control check module 124. The weight output by scale 130 is used by quality control check 124 to check to make sure that the product, refrigerant/warm packs, and the packaging add up to the correct weight that was previously calculated and stored. Label printer 128, is coupled to shipment workstation 126, prints the label for the completed order. The order number is input and stored in a tracking and tracing database 134, coupled to shipment workstation 126.

Tracking and tracing database 134 is configured to receive and store the order's tracking number and to receive and store the recorded internal temperature of the package during transit as recorded by radio frequency temperature recorder 132.

In one embodiment of the present invention, as illustrated in FIG. 1, the package delivered through system 10 can be evaluated and audited. A temperature validation engine 136, advanced delivery notification engine 138, tracking and tracing engine 140, reporting engine 142 and an accounting and auditing engine 144 are utilized by system 10 to evaluate the delivery process. Temperature validation engine 136, which may be located at the shipment recipient's location, validates that the shipped product stayed within the temperature parameters specified by shipper. Temperature validating engine 136 gives a report in any number of forms such as a print out, or on a computer screen. Temperature validation engine receives the temperature date from either temperature recorder 122 or from radio frequency interrogator 132 depending on which configuration bests suits the needs of the shipper or the recipient.

Reporting engine 142 is coupled to the database 114 of system 10 and evaluates the performance and reliability of the optimization engine 108.

Furthermore, reporting engine 142 provides the actual temperature readings recorded by temperature recorder 122 to weather database 146, so as to update the historical database 146a for use in perfecting the creation of future temperature profiles 1100.

In the event that temperature validating engine 136 reports that a product left the desired temperature range, accounting and auditing engine 144 determines where during the transit, the temperature left the specified parameter.

This information can then be used to enforce carrier guarantees through credits.

Advanced delivery notification engine 138 outputs some form of notification such as an e-mail, text message, or automated phone call to notify the recipient that the shipment has been sent. Tracking and tracing database 140 is configured to receive information on the location of the package during transit so that the shipper or receiver can then check where the package is. In one embodiment of the present invention, as illustrated in FIGS. 2a–2d system 10 operates in the following manner.

First, at step 200 the user enters specifications into system 10 at order entry modules 100 or 102 such as customer destination, product, quantity, and delivery constraint information. Next at step 202, optimization engine 108 queries the product database 148 to determine the products properties such as origin (distribution center), temperature parameters (maximum & minimum), mass, staging temperature, thermal properties, and appropriate packaging types (containers & refrigerant/warm packs) available in the packaging database 150.

As illustrated in FIG. 3 is a screen shot of an order entry phase. Menu 300 shows the user's step in the order entry phase. The display includes boxes for recipient first name 302, last name 304, company name 306, address "1" 308, address "2" 310, city 312, state 314, postal code 316, country 318, phone, 320, fax 322, email 324, and a button next step 326.

FIG. 4 is a screen shot of the delivery constraints in the order entry phase.

The display includes a menu 300, a pull down selection for carrier 402, ship date 404, delivery date 406, date specified 408, time of day 410 advanced delivery notice via 416, and a box to select reverse logistics 412, and advanced delivery notification 414. Reverse logistics refers to election to use reusable containers so as to save money on future shipments.

Based on the destination, origin, and delivery constraints obtained, the optimization engine 108 determines all of the ways to ship the package by querying the carrier/mode database 153, at step 204. In one embodiment of the present invention, packaging database 150, product databases 148, and carrier/mode database 152 are configured so that the user can input the properties of the packages, products, the location of the company, location of distribution centers and the carrier/modes.

Figure 5:
FIG. 5 is a screen shot of the company's information stored during the setup phase, in accordance with one embodiment of the present invention.

FIG. 5 illustrates a set up phase window wherein the company information is entered into database 114. The display includes a menu 500, a contact name box 502, contact title box 504, company name box 506, address "1" box 508, address "2" box 510, city box 512, state box 514, postal code box 516, country box 518, phone number box 520, fax number box 522, and email box 524, and a button 526 for activating the next step.

FIG. 6 illustrates a DC's (distribution centers) entry screen for the setup phase. The display contains a contact name box 602, contact title box 604, company name box 606, address "1" box 608, address "2" box 610, city box 612, state box 614, postal code box 616, country box 620, phone number box 622, fax number box 624, e-mail box 626, and a distribution center pull down selection box 628. Button 630 is provided for new DC, and another button 632 to move onto the next step.

FIG. 7 illustrates a packaging entry screen for the setup phase. The screen has a pull down selection box 702 for the item type, a box 704 for the item #, inside dimension box 706, outside dimension box 708, weight box 710, manufacturer by box 712, manufacture# box 714, a pull down selection box 716 for type, and pull down selection box 718 for view item. Two buttons are provided, a first button 720 for new item, and a second button 722 for the next step 722.

FIG. 8 illustrates a product entry screen during the setup phase. The screen has a box 802 to enter the item#, item name box 804, manufactured by box 806, manufacture# box 808, outside dimensions box 810, weight box 812, staging temperature box 814 and pull down selection box 816 for the temperature parameters, and view item box 818. Two buttons are provided, the first button 820 is for a new item and a second button 822 for the next step.

Figure 9:
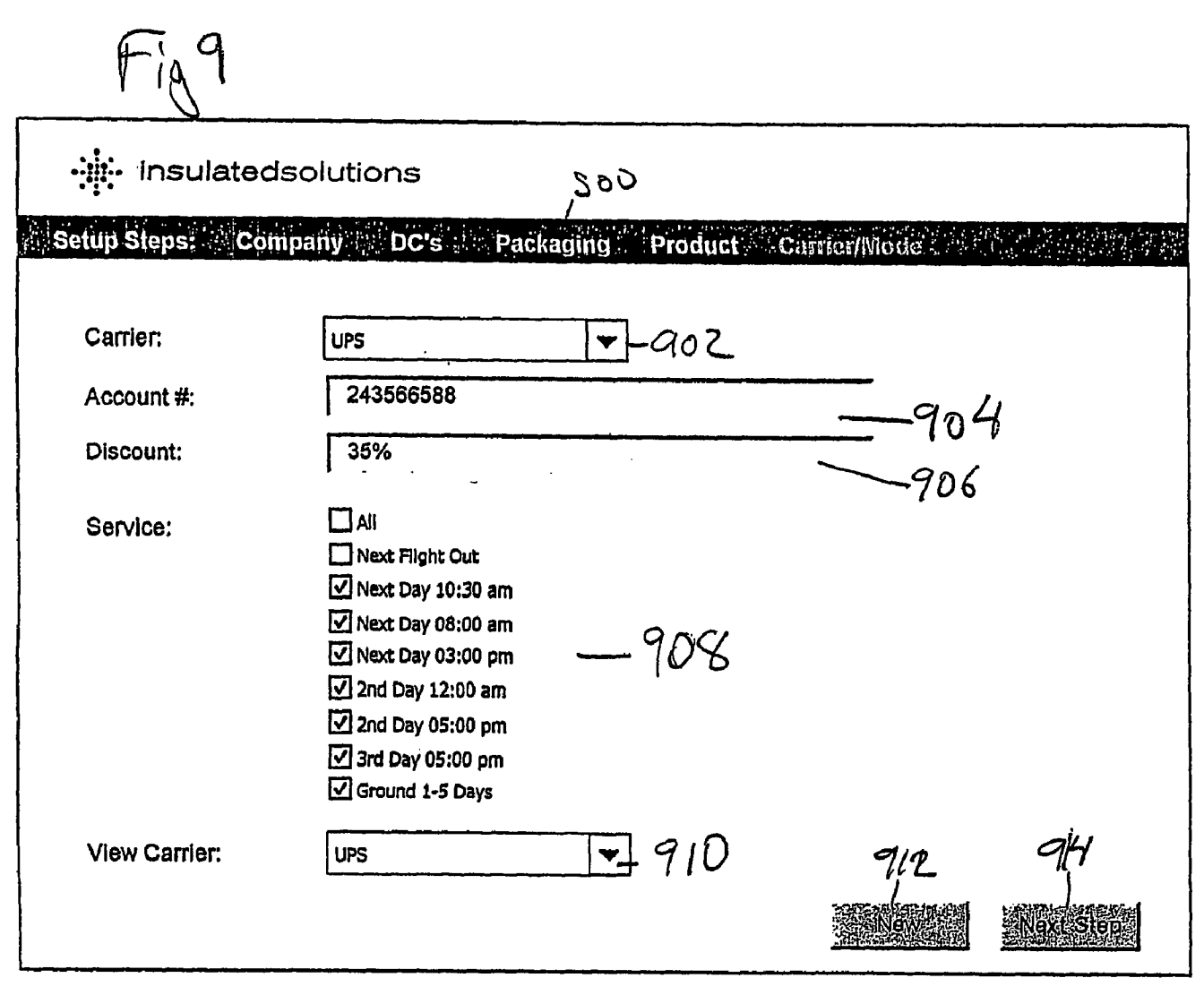

FIG. 9 illustrate a carrier/mode entry screen for the setup phase, located on the top of the screen is a menu 500. A pull down selection box 902 is provided for entering the carriers that the shipper employs. There are also boxes for the account# box 904, discounts box 906, boxes 908 to select the service or mode that the carrier offers, and pull down selection box 910 for selecting the carrier to view. Two buttons are also provided, the first button 912 for new carrier and the second button 914 is next step.

In one embodiment of the present invention, as illustrated in FIG. 2, returning to the optimization process after the necessary information has been entered into system 10 and stored in database 114, system 10, queries product database 148 to determine the safety buffer required for each delivery option, at step 206. As discussed above, the safety buffer refers to the thermal range in addition to the temperature parameters provided that will ensure safe delivery of the package, particularly in the case of extremely temperature sensitive products.

Next at step 208, using carrier/mode database 152, carrier/mode routing engine 112 determines the total time, including the safety buffer, that each delivery option requires. At step 210, querying product database 148 and packaging database 150, optimization engine 108 determines all of the possible packaging container options for the product. For each viable packaging container option, the outside dimension, inside dimension, weight, cost, and thermal properties (R-value, insulation thickness, etc.) are obtained.

Next at step 212, system 10 creates a "packaging system" for each viable package option. Each packaging system includes the container (fixed), the product shipped (fixed), and the refrigerant/warm pack quantity (variable).

Querying the product database, at step 214, system 10 determines the ambient temperature for each packaging system during its route. In step 216, ambient thermal temperature modeling engine 110 generates an ambient thermal temperature profile 1100, as illustrated in FIG. 11 based on predetermined information (static), based on historical temperatures by querying weather database (historical) 146a, or based on actual real-time forecasted weather data by querying the weather database (forecasted) 146b.

In step 218, packaging thermal modeling engine 106 calculates the amount of refrigerant/warm packs necessary for the packaging system to stay within the required temperature parameters as determined in product database 148 for the previously calculated required time period, for the shipping route.

At step 220, knowing the refrigerant/warm pack quantity necessary to maintain the product within its temperature parameters for each packaging system, system 10 stores each result in memory as a feasible shipping solution.

In step 222, by querying the packaging database 150 the optimization engine eliminates all possible shipping solutions that require more refrigerant/warm packs than the insulated container can contain by volume. In step 224, carrier/mode costing engine 104 determines the shipping cost for each possible shipping solution that has not been eliminated.

At step 226, system 10 queries packaging database 150 and determines the total cost of each feasible shipping solution by adding the total packaging cost for each possible shipping solution to the shipping cost determined above. In step 228, optimization engine 108 then presents the user at selection module 116 with all the possible shipping solutions sorted by total cost, or total cost by specified delivery date or any other useful method of organization on which the shipper may base their shipping decision. (FIG. 10 illustrates the screen 1000 for shipping solutions 1010 selection. As illustrated, selection options 1010 include the expected delivery date, carrier and cost, however, this is in no way intended to limit the scope of the present invention. For example, additional criteria that may be displayed on screen 1000 in solutions 1010 include but are not limited to, shipping weight, packaging type/material, insurance cost, refrigerant/heat amount and cost) An step 230, the user (order-entry) selects a possible shipping solution.

That selected shipment solution is stored in shipment solution database 118, at step 232. As discussed above shipment solution database 118 may use a preselected solution or an actively chosen solution. Next at step 234, a pick list is generated from the shipment solution database 118 when the user (pick/pack) selects to pack an order. This includes the selection of the appropriate container with its insulating packing material, including the amount of refrigerant warm pack needed.

At step 236, user (pick/pack) module 120 completes the pick/pack function and places the package on scale 130 of shipment workstation 126. At step 238, the user (pick/pack) 120 enters or scans the order number into shipment workstation 126. At step 240, shipment solution database 118 sends shipment information to shipment workstation 126.

At step 242, quality control check module 124 verifies the weight of the complete package and determines if the weight matches the weight stored in shipment solution database 18. In step 244, shipment workstation 126 prints the appropriate label from label printer 128 for the completed order and stores the order's tracking number in tracking and tracing database 134.

Next at step 246, radio frequency interrogator 132 queries product database 148 to determine the products temperature parameters for that order.

Radio frequency interrogator 132 sends a signal to radio frequency temperature recorder 122 to begin recording the temperature inside the container, step 248.

As discussed above, temperatures that are recorded beyond a tolerance range trigger an out of range alarm indicator.

In step 250, the recipient of the package determines if the product has traveled safely within its temperature parameters. Radio frequency interrogator 132 downloads the internal temperature of the package in transit and saves them in tracking and tracing database 134 for validation and auditing purposes. At step 252, by querying database 114 of system 10 reporting engine 142 evaluates and audits system's 10 performance and reliability and fine tunes system 10 for maximum efficiency.

The invention delivers numerous advantages to clients. The system removes guesswork when shipping perishables. It reduces product spoilage, improve customer satisfaction, and reduce inventory and distribution costs. It helps shippers comply with existing government and carrier regulations and offer clients means to enhance growth with an opportunity to expanding into new markets and subsequent sales opportunities. The invention enables a company to better utilize its internal resources-thus reducing the time and energy required to manage their transportation operations. The invention is a systematic approach for creating, implementing and managing a transportation master strategy.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

I claim:

1. A method for generating a list of package shipment routes in a shipment solution system, said method comprising the steps of:

entering product and packaging information, place of origin, destination and shipment temperature parameters for a package into said system, wherein said product is a perishable product, and the temperature parameters corresponds to an exposure level beyond which said product will perish;

generating a listing of all possible shipment routes available for said package between said place of origin and said destination;

for each of said shipment routes, generating an ambient thermal temperature model corresponding to the external temperatures said package including said product information, insulation in said package, and refrigeration or heating used in said package and analyzing said thermal characteristics along said available shipping routes, based on each of said ambient thermal temperature models, so as to determine feasible shipment routes and corresponding packaging information, sufficient to prevent said product from perishing by preventing the temperature of said perishable product from diverting from said exposure level;

for each of said feasible shipment routes, calculating the cost for shipment along said feasible shipment routes based on packaging and delivery cost; selecting a route for delivery from among said feasible shipment routes, and presenting said selected route to a user so as to allow said user to ship said perishable product via said selected route.

2. The method according to claim 1, wherein said step of entering shipment temperature parameters includes the entering of an acceptable temperature range in degrees.

3. The method according to claim 1, wherein said step of generating a listing of all possible shipment routes available for said package between said place of origin and said destination is based on carriers employed by a shipper employing said shipment solutions system and modes of delivery available by each of said carriers.

4. The method according to claim 1, wherein said step of generating an ambient thermal temperature model further comprises the step of retrieving stored weather temperatures for each portion of the shipment route.

5. The method according to claim 4, wherein said step of generating a thermal temperature model further comprises the step of retrieving historical data contained in said weather database collected from prior shipments.

6. The method according to claim 4, wherein said step of generating a thermal temperature model further comprises the step of retrieving forecasted information contained in said weather database.

7. The method according to claim 1, further comprising the step of forwarding to a selection module for selection by a user said costs for shipment along said feasible shipment routes.

8. The method according to claim 7, wherein said step of forwarding to a selection module further comprises the step of presenting to a user, information related to expected arrival date of said package at said destination.

9. The method according to claim 1, wherein said step of selecting a route for delivery further comprises the step of storing shipper selection preferences so as to automatically select a particular feasible shipment route based on a desired criteria.

10. The method according to claim 9, wherein said selection of a particular feasible shipment route based on a desired criteria, includes a decision based on any one of a cheapest solution, a most cost efficient solution and a worst case scenario solution.

* * * * *